United States Patent [19]

Starkey et al.

[11] 3,751,166

[45] Aug. 7, 1973

[54] COMMAND GUIDANCE TRANSMITTER SYSTEM

[75] Inventors: George W. Starkey; Robert L. Sitton; Jimmy R. Duke; Walter E. Miller, Jr., all of Huntsville, Ala.

[73] Assignee: The United States of America as represented by the Secretary of the Army, Washington, D.C.

[22] Filed: June 3, 1971

[21] Appl. No.: 149,801

[52] U.S. Cl.................... 356/5, 307/246, 244/3.16, 356/152
[51] Int. Cl............................................. G01c 3/08
[58] Field of Search........................... 356/152, 4, 5; 250/203 CT, 203 R, 217 SS; 244/3.16, 3.13; 178/DIG. 21; 307/268, 270, 246; 331/94.5 P, 94.5 H

[56] References Cited
UNITED STATES PATENTS

| 3,305,633 | 2/1967 | Chernoch | 356/5 |
|---|---|---|---|
| 3,590,248 | 6/1971 | Chatterton, Jr. | 331/94.5 P |
| 3,454,789 | 8/1969 | Tyler et al. | 307/235 |
| 3,397,404 | 8/1968 | Highleyman | 307/246 |
| 3,380,358 | 4/1968 | Neumann | 356/5 |
| 3,463,588 | 8/1969 | Meyerand, Jr. et al. | 356/5 |
| 3,648,073 | 3/1972 | Sams et al. | 307/246 |
| 3,614,025 | 10/1971 | Maillet | 244/3.16 |
| 3,615,135 | 10/1971 | Frazer | 356/5 |
| 3,644,043 | 2/1972 | Jones et al. | 356/5 |

Primary Examiner—Benjamin A. Borchelt
Assistant Examiner—S. C. Buczinski
Attorney—Harry M. Saragovitz et al.

[57] ABSTRACT

A command guidance, ranging, and night vision system is provided which utilizes a single optical source. A gallium arsenide laser diode array generates pulses of optical energy in response to high frequency modulation by a transistor driver. The laser array is cryogenically cooled allowing diode array operation at high average power and enhancing the output wavelength. An image intensifier tube with a gating power source therefor is synchronized with the array output pulse, being gated on only when the reflected return signal is expected, sometime after the array output pulse is transmitted. The night vision intensifier tube is used in conjunction with the diode array by an operator to locate a target. When a target is located the gating capability of the night vision device is used to determine the range from the operator to the target.

1 Claim, 3 Drawing Figures

PATENTED AUG 7 1973        3,751,166
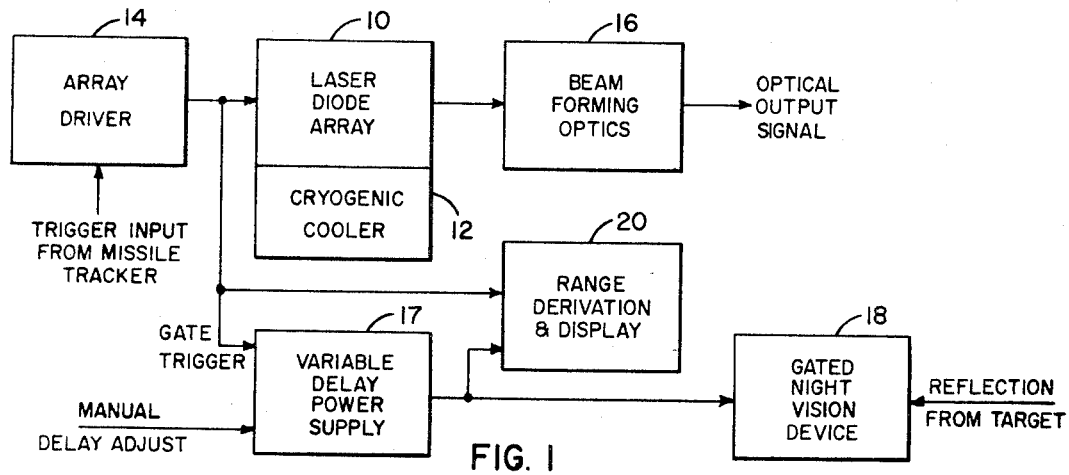
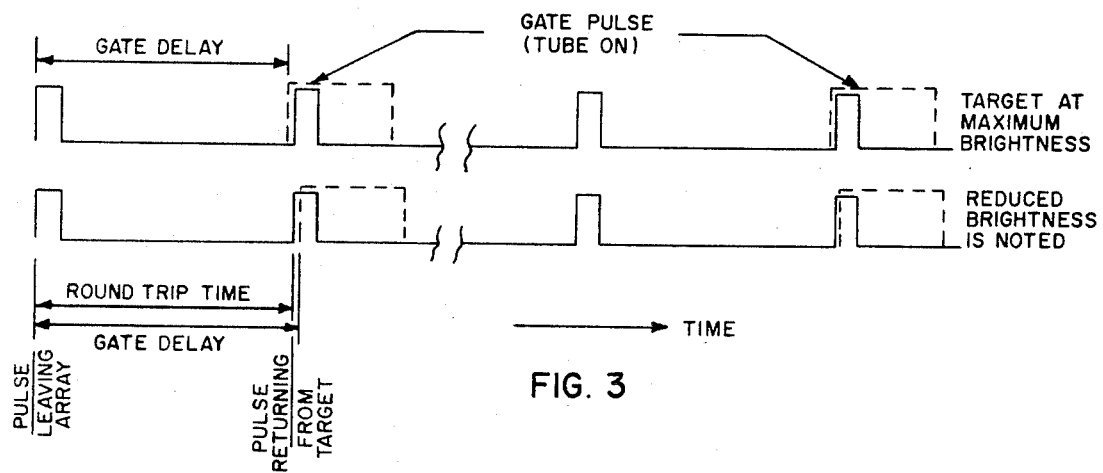
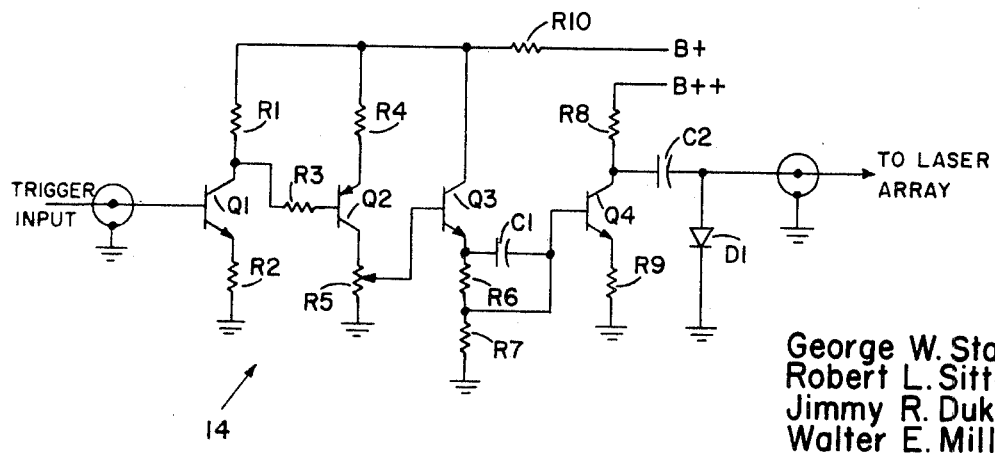
George W. Starkey
Robert L. Sitton
Jimmy R. Duke
Walter E. Miller, Jr.
INVENTORS.

COMMAND GUIDANCE TRANSMITTER SYSTEM

BACKGROUND OF THE INVENTION

In existing automatic command-to-line-of-sight missile systems a man is utilized for purposes of target location, identification, and designation. Target designation is accomplished by maintaining the crosshairs of a telescope on the target during missile flight. The missile is tracked automatically and correctional commands are generated to maintain the missile flight trajectory coincident with the operator's visual line-of-sight. In utilizing optical command guidance systems for additional functions such as night illumination and ranging, additional hardware such as gatable imaging devices are necessary. Whereas missile command functions require only a very narrow beam pattern (less than 1°), night illumination functions require a larger beam spread. An acceptable minimum night illumination and ranging beam intensity is a 3° vertical by 5° horizontal beam. Uniform beam spread is required to permit the operator to identify contrasting areas in the reflected image display as target characteristics rather than be confused by holes or hot spots in the beam. The center of the beam, used for missile communication, must be free of holes that can cause loss of command signals. Thus, beam forming optics must include an optical integrator which provides uniform radiance of optical output energy, and can be imaged to provide the uniform intensity beam. This is done while maintaining the intensity and modulation characteristics necessary for communicating commands to the missile.

SUMMARY OF THE INVENTION

The command guidance transmitter system provides for the simultaneous functions of night vision, target ranging, and commanding a missile. It is compatible with existing missile system receiver electronics and trackers. The system can be employed where only the functions of night vision and ranging are required, however it is not limited only to night operation. With appropriate optical filtering it will provide adequate illumination for ranging and missile guidance under daytime conditions wherein the missile command function may be accomplished even in the presence of solar interference. Only one optical source is required to provide the three functions of command guidance, night vision, and ranging, affording advantages of savings in weight, volume, and system complexity. The optical energy output is derived from gallium arsenide (GaAs) laser diode arrays modulated at a high frequency rate to provide a pulsed output. By crygenically cooling the laser arrays higher power outputs are obtainable from the system.

An object of the present invention is to provide a single system which gives an operator the capability of performing the three functions of night vision, range determination, and optical command guidance signal for missile delivery.

Another object of the present invention is to provide a gallium arsenide laser diode array having a high frequency transistor driver and providing high power optical energy output.

BRIEF DESCRIPTION OF THE DRAWINGS

FIG. 1 is a block diagram of a preferred embodiment of the transmitter system.

FIG. 2 is a schematic diagram of a transistorized array driver.

FIG. 3 typically discloses ranging and range error determined by the system.

DESCRIPTION OF THE PREFERRED EMBODIMENT

Referring now to FIG. 1, a GaAs laser diode array 10 is positioned for cooling to cryogenic temperatures (approximately 77°K.) by a cryogenic cooler 12. Array 10 is modulated by a driver circuit 14 to provide a pulse of laser energy which is formed and narrowed by beam forming optics 16 and directed toward a target or missile. Array driver 14 is gated or triggered by an input signal from missile tracking equipment to provide the high frequency periodic pulsing of diode array 10. An output signal from array driver 14 is also coupled through a variable delay power supply 17 to gated night vision device 18 for momentarily activating the device to receive reflected energy from the target or missile. The reflected optical energy received from a target is amplified by night vision device 18 for observing the image of the target. The array driver output and the variable delay power supply output are coupled to range derivation and display electronics 20, which converts the time difference in these two outputs into range.

The gated night vision device is a three stage image intensifier tube, which is on only for the duration of the gate pulse received from power supply 17. An image intensifier tube capable of providing the functions required is model 3168 manufactured by Varo Incorporated. The power supply used with this image intensifier tube provides both gating and delay functions and typically can be provided by model 23426 manufactured by Venus Scientific Incorporated. These power sources typically can be gated at a 10K hertz rate with the gate pulse width variable from 0.5 to 1000 microseconds. The gate pulse can be externally triggered for synchronizing the image intensifier tube "on" time with an external event. The gating circuitry also provides a continuously variable time delay between an external trigger pulse and the gate pulse which turns the tube on.

The range derivation and display electronics 20 can be any typical circuitry capable of measuring the elapsed time between the occurrence of two pulses, converting this elapsed time to range by using the velocity of light as a factor, and displaying the range for the operator. Circuitry capable of performing this function can be similar to that used in other range finder devices. Typically, an oscilloscope such as the Tecktronix model 585 can provide this capability.

A laser diode array 10 capable of providing sufficient illumination for the transmitter system output is available from Laser Diode Laboratories Incorporated under part number LD440. The narrow spectral bandwidth of the optical output of laser diodes permits maximum filtering of any unwanted background illumination. The fast rise time of the output optical pulse makes them ideal for the ranging functions. The laser diode array is cooled to enhance the average output power capability and to shift the spectral output wavelength to a region in which the image intensifier tube is more sensitive. Cooling of laser diodes also significantly lowers their input current requirements thus making practical a completely transistorized array modulator.

Cryogenic cooler 12 allows the laser diode array to be operated at high average powers and enhances the output wavelength of the diode array. It also lowers the input current requirements of the diode array. A cooler capable of performing this function is the Mark X60A manufactured by the Malaker Corporation. Since current requirements are quite small for cryogenically cooled laser diodes, the array pulsing and modulation is obtainable using completely transistorized circuitry for array driver 14. A transistorized array driver 14 allows high pulse repetition rates to be obtained from the laser diode array. Typical driver output is a pulse train of one microsecond pulses at a nominal 10Khz repetion frequency. The minimum pulse period is limited by the maximum gating frequency of the image intensifier. Driver output current is typically 4.0 amperes peak at 400 volts.

In the array driver schematic of FIG. 2, transistors Q1, Q2 and Q3 are cascaded to provide a low voltage gate for a power transistor Q4. Transistor Q1 has the collector connected through a resistor R1 to the collector of Q3 and through a resistor R3 to the base of Q2. The emitter of Q2 is connected through a resistor R4 to the collector of Q3 and further through resistor R10 to a direct current power source B+. The emitter of Q1 is connected through resistor R2 to ground and the collector of Q2 is connected through a poteniometer R5 to ground with the variable arm of R5 being coupled to the base of Q3, providing an external current adjustment for the driver. The emitter of Q3 is connected through the series connection of R6 and R7 to ground. A common point between R6 and R7 is coupled to the base of power transistor Q4 which maintains Q4 normally cut off. A capacitor C1 is strapped in parallel with resitor R6 allowing a positive voltage surge to be felt on the base of Q4 when transistor Q3 activates. A high direct voltage input B++ provides dc power through a resistor R8 to the collector of Q4, the emitter of Q4 being connected through a resistor R9 to ground. A path to ground is further provided from the collector of Q4 through a coupling capacitor C2 in series with a blocking diode D1 to ground. A common point between C2 and D1 is coupled as an output signal to array 10 and variable delay power supply 17. A positive trigger input pulse from missile tracking equipment to the base of Q1 activates in sequence Q1, Q2, Q3 and Q4. Prior to activation of Q4 capacitor C2 charges through diode D1. When Q4 is gated on, the B++ side of C2 is immediately dropped to near ground potential causing a high negative pulse to be coupled out for driving diode array 10.

For ranging, the image intensifier gate pulse width is set at 1 microsecond to match the optical pulse width, and the image intensifier delay and gating circuitry is triggered by each optical pulse as it leaves the array. The delay capability of the night vision gating circuitry is used to locate the return pulse from the target. The variable delay of power supply 17 is manually adjustable by the operator viewing the target through the image intensifier. The tube is thus gated on at the instant each pulse is anticipated from the target. The image intensifier tube integrates the train of pulses returning from the target thus making the target visible due to the total power illuminating the target. By adjusting the delay between the time an optical pulse leaves the laser array and the tube gate pulse, the target brightness can be varied. As noted in FIG. 3, ranging is accomplished by using the delay time between the leading edge of the optical pulse, as it leaves the array and the leading edge of the gate pulse when a change in the brightness of the target is noted. This delay time is the round trip time of the optical pulse from the operator to the target and back. Since the velocity of light is constant the range from the operator to the target is given by the equation: Range = ½ (delay time)(velocity of light). Alternately in determining range the gate pulse delay time may be used at which the threshold of target detection occurs. This is the delay time at which the irradience level on the target allows the target to just become visible.

Attenuation of background optical noise is of particular importance during night time operation. Optical noise can cause scene degradation in the night vision device. Any optical source other than the included transmitter, in the field of view of the night vision device, is considered noise for this system. Typical noise sources are the missile motor plume and on-board beacon used for tracking purposes. The image tube is on only during the time optical returns are being expected from the target, allowing attenuation of background noise. Further attenuation of background noise can be obtained by the use of a spectral bandpass filter in the night vision optical train. The operator can use the night vision device 18 in conjunction with diode array 10 to locate a target without gating the device. However, when a target is located the gating capability of the night vision device is used as hereinabove described to determine the range from the operator to the target if desired. The night vision device allows track of the target while the missile is in flight and a coded input to the diode array allows the missile to be commanded while in flight, a coded input being derived from the present missile system tracker output.

Thus, in a missile command guidance system, a fixed tracking station is disposed for distinguishing and maintaining track of a target. A command guidance transmitter system includes a single optical source for providing night vision, target ranging, target tracking, and command guidance of a missile. The laser array or optical source is driven by a high frequency modulating means which is a high frequency transistor driving circuit for pulsing the array on and off. When the diode array is periodically activated at a high frequency rate to modulate the optical beam the beam is directed toward the target. Energy reflected back from the target is received and detected by the night vision means and range derivation and display means respond to the night vision means to provide target range.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:

1. A command guidance transmitter system including a single optical source for providing night vision, target ranging, and commanding a missile, comprising: a gallium arsenide laser diode array for providing a directional optical output, a high frequency transistor driving circuit for alternately pulsing said diode array on and off, said transistor driving circuit including a high power transistor output stage having a common emitter and coupled to provide high frequency negative output current pulses, and a low voltage, three stage cascaded transistor gate for periodically activating said power transistor, cryogenic cooling means for said array, gated night vision means for receiving and detecting reflected laser energy of said array, beam forming optical means in the output path of said array for compressing and expanding the beam spread of said array, increasing the operating range thereof, and range derivation and display means responsive to said gated night vision means for providing said target range.

* * * * *